United States Patent [19]

Tennent et al.

[11] Patent Number: 4,892,857
[45] Date of Patent: Jan. 9, 1990

[54] ELECTRICALLY CONDUCTIVE CERAMIC SUBSTRATE

[75] Inventors: David L. Tennent, Lindley; Gerald D. Fong, Beaver Dams; Christine L. Hoaglin, Painted Post, all of N.Y.

[73] Assignee: Corning Incorporated, Corning, N.Y.

[21] Appl. No.: 52,253

[22] Filed: May 20, 1987

[51] Int. Cl.⁴ ............................................. B01J 35/04
[52] U.S. Cl. ..................................... 502/439; 428/629; 428/633; 428/640; 428/469
[58] Field of Search ............... 428/632, 633, 627, 629, 428/613, 640, 472, 469; 502/439

[56] References Cited

U.S. PATENT DOCUMENTS

| | | | |
|---|---|---|---|
| 3,189,563 | 6/1965 | Havel | 502/439 |
| 3,507,627 | 4/1970 | Frank et al. | 502/527 |
| 4,036,784 | 7/1977 | Gembicki et al. | 502/439 |
| 4,076,888 | 2/1978 | Perugini et al. | 502/439 |
| 4,335,023 | 6/1982 | Dettling et al. | 502/439 |
| 4,459,372 | 6/1984 | Arena | 502/439 |
| 4,532,190 | 7/1985 | Kambe et al. | 428/632 |
| 4,563,371 | 1/1986 | Siriayon et al. | 204/38.4 |

FOREIGN PATENT DOCUMENTS

117633  5/1987  Japan .................................. 502/439

OTHER PUBLICATIONS

I. M. Lachman et al., "Monolithic Honeycomb Supports For Catalysts", CEP Jan. 1985, pp. 24–31.

*Primary Examiner*—John J. Zimmerman
*Attorney, Agent, or Firm*—Charles Q. Buckwalter, Jr.; Peter J. Cronk; Richard N. Wardell

[57] ABSTRACT

An apparatus for use in liquid-phase, gas-phase and mixed-phase reactions is disclosed for providing an efficient flow-through design within which results a low pressure drop. The apparatus may be used as a catalyst or electrocatalyst and consists essentially of a ceramic substrate having thin walls with open porosity wherein said walls define a plurality of cells extending substantially longitudinally parallel through-and-through the substrate. The substrate includes an electrically conductive layer, having a resistivity of no greater than about 100 ohm-cm. The apparatus exhibits an improved structural geometry and provides greater meniscus control.

14 Claims, No Drawings

ELECTRICALLY CONDUCTIVE CERAMIC SUBSTRATE

FIELD OF THE INVENTION

This invention is directed to the use of ceramic substrates in liquid and gas phase reactions and particularly to substrates which are electrically conductive and can serve as electrochemical catalytic reactors.

BACKGROUND OF THE INVENTION

Recently, a commercial application of electrocatalysis has featured a porous electrode system composed of loosely packed conducting particles such as graphite. See Joseph Haggin, "Trickle-Bed Electrolytic Cell For Peroxide Developed", *C & E News,* 1984, 62, #11, 16. Haggin describes the use of a porous electrode for large scale production of hydrogen peroxide. The key development in this cell design is the utilization of an electrode material prepared by compressing graphite chips coated with a Teflon-carbon black matrix. Although the "packed-bed" composite fabricated from this procedure provides extended surface area, it does not possess the coherent strength of an integral structural support and is, therefore, subject to mechanical failure.

Electrodes of this kind suffer from several processing disadvantages. Because of path flow impedance, there is a large pressure drop between the inlet and outlet ends of the packed bed systems. The high path flow impedance is derived from a convoluted passageway, which is intrinsic to the packed bed system. This feature inhibits easy access to all of the available electrode surface area.

Another critical disadvantage to the packed-bed system arises from the irregular shape of the spaces between the graphite chips. In a three-phase system, defined herein as a solid electrode in simultaneous contact with a liquid and gas, it has been previously shown that almost all of the Faradaic charge passes through the thinnest portion of the meniscus which is the situs of the three phase system. B. Cahan et al., *J. Chem. Phys.,* 1969, 50, 1307. In a packed-bed system the existence of random and irregular shapes of the passageways precludes control of the charge transfer through manipulation of the meniscus shape.

The art is now replete with various suggestions for electrocatalysts. Spaziante et al., U.S. Pat. No. 4,214,970, discloses electrocatalytic electrodes having an electrically conductive porous base and a electrocatalyst coating. The porous base of this catalyst is disclosed as comprising graphite, carbon strands or sintered metal. There is, however, no teaching for a ceramic substrate having thin walls. Secrist, U.S. Pat. No. 4,484,997, discloses a corrosion-resistant ceramic electrode for the electrowinning of aluminum in Hall-Heroult cells. The ceramic electrode has a conductive ceramic substrate of a base material and at least one additive material which can be diffused from the substrate to the coating by heat treatment. The electrodes characterized in the examples of this patent are Cu/Sb doped $SnO_2$ anodes.

Ray, U.S. Pat. No. 4,374,761 discloses an inert electrode composition suitable for use in the electrolytic production of metal from a metal compound. The electrode comprises a ceramic oxide composition with a metal powder dispersed through the ceramic composition for purposes of increasing its conductivity.

Despite the commercial success of such catalysts, there is still a need for a catalyst that will accommodate a continuously moving, reaction situs of liquid and gas reactants with a minimal pressure drop. There is also a need for an electrocatalyst exhibiting better efficiency in raw material and energy usage.

SUMMARY OF THE INVENTION

The present invention provides a novel apparatus for reactions of liquid and/or gas reactants and a method of fabricating the same. The apparatus consists essentially of a substrate of ceramic, glass-ceramic, glass, or mixture thereof having interconnected or interlaced thin walls with open porosity wherein said thin walls define a plurality of cells extending substantially longitudinally parallel through-and-through the substrate so as to be open at both ends for passage therethrough of liquids and gases. The substrate, of honeycomb-like configuration, has an electrically conductive layer, having a resistivity of no greater than about 100 ohm-cm. Electrical conductivity is provided to the substrate by three general methods: incorporating into the substrate a component which may be made conductive, providing a layer of a conducting material within the walls of the substrate, and by providing a coating of a conducting material on the exterior surfaces of the walls of the substrate. References hereinafter to the "substrate" or "surface of the substrate" are intended to mean the thin walls of the substrate and the surface of such walls.

The present invention provides several methods to introduce electrically conducting material onto or into the substrate body. A first method comprises providing a mixture of a ceramic material including at least one transition metal oxide, extruding the mixture to form a substrate, sintering said substrate, then heating the resulting substrate to diffuse the transition metal oxide to the external surfaces of the substrate or proximate to said surfaces, and reducing the transition metal oxide to its substantially elemental metal form to provide a substantially continuous conductive layer. A second method further provides a thin layer of metal on said substrate. This method may also comprise the further steps of depositing the thin layer of a second metal, oxidizing the initial transition metal, and rediffusing the resultant transition metal oxide back into the ceramic substrate, leaving substantially only the thin layer of said second metal or an oxide thereof.

The ceramic electrode of this invention provides an efficient flow-through design within which results a low pressure drop. The geometry of the electrode structure provides greater meniscus control than its earlier reactor counterparts. An additional benefit of the structural geometry is that substantially more of the electrocatalytic material contacts the reactants.

The substrate of this invention can be supplied with through-and-through open cells (also referred to herein as channels) of various sizes and shapes resulting from the choice of the extrusion die. Finally, the substrate is structurally superior to the graphite-based, packed-bed systems of the prior art, since the packed-bed systems lack structural continuity.

It is an object of the present invention, therefore, to provide a monolithic ceramic substrate with an electrically conductive integral layer which is capable of efficient electrochemical conversions.

It is a further object of this invention to provide a ceramic substrate which exhibits improved structural integrity over the prior art packed-bed system while at the same time exhibiting a minimal pressure drop, increased meniscus control, and a more efficient use of the electrode surface area.

DETAILED DESCRIPTION OF THE INVENTION

The following description is provided to enable any person skilled in the ceramic and/or chemical processing fields to make and use the invention and sets forth the best mode contemplated by the inventors for carrying out their invention. Various modifications, however, will remain readily apparent to those skilled in the art since the generic principles of the present invention have been defined herein specifically to provide a relatively economical and easily manufactured ceramic electrocatalytic structure.

The invention herein described includes a substrate having thin walls with open porosity wherein said thin walls define a plurality of cells extending substantially, parallel through the substrate so as to be open at both ends for passage therethrough of liquids and gases. The substrate is provided with a thin metal-containing layer having a resistivity of no greater than about 100 ohm-cm to provide electrical conductivity to the substrate. In a first embodiment of the invention, the metal layer comprises a layer of a transition metal on the surfaces of the substrate (for example, as a coating) or proximate to said surfaces and integral with the ceramic material of the substrate so as to form a substantially continuous, conductive layer therein. In another embodiment, a second metal-containing layer is integral on the first layer. When said first integral layer is present, said second layer will be present as a film superposed on said first integral layer. In either form, the combination of the first and second layers provides the substantially continuous conductive layer of this invention. In still another embodiment, a second metal-containing layer is superposed on the first transition metal-containing layer and then the transition metal-containing layer is reoxidized and rediffused, leaving substantially only said superposed second layer as the conductive layer or a combination of said superposed second layer mixed with a residual integral layer.

In a preferred method of this invention, an apparatus for use in liquid-phase, gas-phase, or mixed-phase reaction can be fabricated by first providing an admixture of substrate materials selected from the group consisting of glass, glass-ceramic, ceramic , and a mixture of these, said admixture including at least one transition metal oxide. The admixture is then preferably extruded into a form having thin walls with open porosity, wherein said thin walls have an external surface and define a plurality of cells extending substantially longitudinally parallel through the substrate so as to be open at both ends for the flowable passage of liquid or gases. The thin walled substrate is next preferably heated at a temperature and for a time sufficient to sinter the substrate and to diffuse at least a portion of the transition metal oxide to a position which is proximate to said external surface of the cell walls of the substrate. The resulting transition metal oxide then can be reduced to form a substantially continuous layer of transition metal integral with the cell walls. It is also preferred that the substrate next be coated with a second metal containing layer on top of said integral transition metal containing layer, wherein the combination of said transition metal layer and said second layer provides a substantially continuous conductive film having a resistance no greater than about 100 ohm-cm.

The substrates of this invention can be manufactured using specially formulated glasses, materials, conventional ceramics or glass-ceramics. In the preparation of the ceramic compositions, metal oxides of the kind traditionally used in ceramic manufacturing, and binders, are admixed into a substantially homogeneous body, which can be formed into the desired shape, and then heated according to conventional techniques known to the ceramic arts. Examples of such oxides or combinations thereof are silica, alumina, titania, zircon, magnesia, calcia, zirconia, cordierite, mullite, and kaolin. Specific starting compositions are further exemplified herein but the invention is not limited to these particular oxides. Moreover, as those skilled in the art will recognize, the invention contemplates the use of other ceramic materials or additives which are commonly used and which have the described characteristics.

The ceramic substrates of this invention are ideally prepared by mixing the oxide compositions with a temporary binder. These ceramic materials are preferably in the form of finely divided powders of a size finer than 100 mesh (U.S. Capital Standard), more preferably finer than 200 mesh, and most preferably finer than 325 mesh. Generally, 1-30 parts by weight of binder will be combined with 100 parts by weight of the ceramic materials. Binder materials conventionally used in ceramic manufacture are suitable. Examples are disclosed in the following articles, incorporated herein by reference:

"Ceramic Processing Before Firing," ed. by George Y. Onoda, Jr. & L. L. Hench, John Wiley & Sons, New York "Study of Several Groups of Organic Binders Under Low-Pressure Extrusion," C. C. Treischel & E. W. Emrich, *Jour. Am. Cer. Soc.*, (29), pp. 129-132, 1946

"Organic (Temporary) Binders for Ceramic Systems," S. Levine, *Ceramic Age*, (75) No. 1, pp. 39, Jan. 1960

"Temporary Organic Binders for Ceramic Systems," S. Levine, Ceramic Age, (75) No. 2, pp. 25, Feb. 1960

Preferred are methyl cellulose or a mixture of methyl cellulose and a silicone resin. The silicone resins preferred for use are Dow Corning Corporation's Q6-2230 silicone resin or those described in U.S. Pat. No. 3,090,691 to Weyer. The most preferred binder is methyl cellulose, available as METHOCEL A4M from the Dow Chemical Company. Up to about 1 percent by weight, based upon total mixture weight, of a surfactant, such as sodium stearate, can also be used to facilitate mixing and flow for subsequent processing. The mixing step should be performed in a liquid, preferably distilled water, which acts as a further plasticizer. When the binder is a silicone resin, it is preferred to use isopropyl alcohol in addition to water. Normally, the dry ingredients are first pre-mixed and then combined with the liquid plasticizer.

The substrates are prepared by combining the components to form a homogeneous or substantially homogeneous mixture. Conventional mixing equipment can be used, but the use of a mix muller is preferred. Mixing is generally continued until a plasticized batch is obtained. Ultimately, the batch is formed into the desired shape, preferably by extrusion through a die or by injection molding. Finally, the "green" shapes are heated to a temperature and for a time sufficient to sinter the constituents and to impart substantial strength to the material. The ceramic shape produced by the above process contains a plurality of open cells which extend from a frontal surface substantially longitudinally through the substrate. Generally, the substrate contains from 0.5 to 2400 cells per square inch of frontal surface area, preferably 50–400 cells, and most preferably 200–300 cells after being fired. Optionally, this heating/sintering step can be incorporated into the heat treatment schedule by which a transition metal oxide is diffused from the substrate interior to a position proximate to the surface of the substrate in the preferred method embodiment to be discussed below, of the method for developing a conducting metal layer as herein provided.

The electrically conductive layer of this invention can be introduced by (1) reducing a transition metal oxide layer which has been diffused to the surface, or proximate to the surface of the substrate, (2) superposing a second metal containing layer over said reduced transition metal oxide layer, wherein said combination is conductive or, (3) in embodiment (2), reoxidizing and rediffusing said reduced transition metal oxide, leaving substantially only said second metal containing layer to serve as the conductive layer. Various methods for providing a metallic, conductive coating in addition to the particular methods illustrated herein, will become apparent to one skilled in the art and are within the scope of this invention. For instance, one method of producing a conductive film is by using ion exchange, as in the example of silver impregnation into Fotoform. Alternatively, conducting films may be formed using a reducible transition metal or doped tin oxide absorbed onto the substrate from appropriately prepared media. See M. Watanabe, S. Venkatesan, H. A. Laitinen, *Journal of the Electrochemical Society*, 130, (1), 59, (1983), which is hereby incorporated by reference. Applicant's invention also contemplates producing a conducting layer on a monolith by coating the structure with vitreous carbon. A hard, conducting layer of vitreous carbon can be made by first applying an organic polymer and then decomposing that film at high temperature in an inert atmosphere. The organic, resin solution can be applied by either a spray or a dip coat allowing the surface to be completely coated. Curing can occur either before pyrolytic decomposition or during the decomposition step.

In a most preferred embodiment of this invention, utilizing a metal-diffusion approach, conductive transition metals are produced in thin layers on certain glass or glass ceramic substrates. More particularly, continuous metal oxide (MO) films can be formed on a glass having a composition as shown in the following table using selected heat treatment schedules in air. In the table, M is a multivalent transition metal cation such as cobalt, copper or iron, and R and R' are alkaline and alkaline earth metals, respectively, preferably Li, Na, K, Mg or Ca.

| GLASS COMPOSITION RANGES | | |
| --- | --- | --- |
| Al$_2$O$_3$ | 2–30 | (weight percent) |
| B$_2$O$_3$ | 0–12 | |
| R$_2$O | 0–14 | |
| SiO$_2$ | 55–80 | |
| TiO$_2$ | 0–08 | |
| R'O | 0–15 | |
| MO | .5–24 | |

According to this embodiment, the glass components are admixed and may be formed into a "green" shape as described earlier. The shape is then sintered, followed by an additional heat treatment which results in the diffusion onto the surface of the sintered substrate of a substantially continuous film of the transition metal oxide (MO). In the further practice of this embodiment, the oxide is reduced to its elemental form, and a second film of conductive metal is deposited thereon as described earlier. The presence of the original transition metal film aids in the deposition of a substantially continuous film of the second metal. The original transition metal can then be reoxidized and rediffused back into the substrate. On the interior walls of each of the through-and-through channels, a film of the second metal provides one embodiment of the conductive, electrocatalytic coating of the invention. A particularly preferred embodiment of this invention, using copper as the transition metal, is prepared by melting a batch composition of the following material:

3900 grams: Sand
2770 grams: Alumina, Hydrate
830 grams: Copper (I) Oxide
150 grams: Lithium Carbonate The batch is melted in a silica crucible at 1650° C. for six hours. The resulting glass has a weight composition of 59.16% SiO$_2$, 26.80% Al$_2$O$_3$, 13.15% CuO and 0.89% Li$_2$O. Upon cooling, the glass is then ground in an alumina ball mill to −200 mesh powder, which is prepared for extrusion by dry mixing the following:

600 grams glass powder
60 grams methylcellulose
6 grams diglycol stearate

The above mixture is milled, mixed, and then extruded.

Once a green-monolithic structure is obtained, the following sintering and heat treatment schedule is used in the production of a glass electrocatalyst with a thin layer of copper metal film resulting on its surface.

1. Heat green substrate to about 275°–400° C., preferably about 300° C., at about 25° C. per hour.
2. Hold at that first temperature for about 1 hour.
3. Heat substrate to a top temperature of about 1200–1450° C., preferably about 1300° C., at about 50° C./hour.
4. Hold at the top temperature for about 1 hour.
5. Cool the now sintered substrate to room temperature at furnace rate.
6. Reheat under a continuous air flow to a treatment temperature of about 475–600° C, preferably about 550° C., for 2–4 hrs. to express copper oxide on the substrate surfaces.
7. Cool the substrate to about 200°–300° C. and hold it for about 1 hour in a hydrogen atmosphere to reduce copper oxide to substantially pure copper.
8. Allow substrate to cool to room temperature under a hydrogen atmosphere.

Reference is herein made to U.S. Pat. Nos. 3,420,645 by Hair and 3,490,887 by Herczog et al which are relevant to the formation of conductive copper films on glass and ceramic substrates. These disclosures are hereby incorporated by reference.

Applicant has successfully extruded and heat treated copper-containing compositions of the foregoing glasses which are structurally strong, conducting substrates wherein resistances are less than 0.1 ohm-cm between any two points examined. Applicant has furthermore devised methods for electrodepositing a platinum layer onto these substrates, whereupon they remain conductive after the original copper surface has been reoxidized and thereby rendered essentially non-conducting. These methods are generally embodied by step 9 above, and will be defined in more detail hereinafter.

Another fabrication method of this invention comprises the exudation of metals from crystalline materials like cordierite. A glass/ceramic cordierite containing copper, cobalt, nickel, tin, titanium, vanadium, zinc and/or zirconium oxides can be fabricated. Starting glass compositions used in this preferred embodiment of the invention include:

| GLASS COMPOSITIONS | | |
| --- | --- | --- |
| $SiO_2$ | 36–50 | (weight percent) |
| $Al_2O_3$ | 22–30 | |
| MgO | 2.1–13.5 | |
| $ZrO_2$ | 2.1–2.8 | |
| $TiO_2$ | 5.7–7.5 | |
| $As_2O_3$ | 0.3–0.4 | |
| NiO | 0–11.2 | |
| CuO | 0–11.9 | |
| ZnO | 0–12.1 | |
| $SnO_2$ | 0–20.3 | |
| $V_2O_3$ | 0–23.5 | |
| $Co_3O_4$ | 0–11.8 | |

As an example of this embodiment, a glass was batched, mixed and melted with the following composition:
  447.4 grams: Silica sand
  266.3 grams: Alumina
  30 grams: Aluminum Nitrate
  128.8 grams: Magnesia
  67.4 grams: Titanium Dioxide
  26.2 grams: Zirconia
  4.2 grams: Arsenic Pentoxide
  60.2 grams: Copper (II) Oxide The composition of the resulting melt, in weight percent, is 44.72% $SiO_2$, 26.97% $Al_2O_3$, 12.64% MgO, 6.72% $TiO_2$, 2.60% $ZrO_2$, 0.36% $As_2O_3$, 5.99% CuO. Upon cooling, the hardened mixture is then ground into a fine powder, mixed with an appropriate binder, and then extruded to form a substrate structure using conventional extrusion processes as set forth previously. The substrate is then sintered, which causes the ceramic material to crystallize. The copper oxide diffuses to form a continuous layer integral with the surface of the substrate. Further heat treatment in a "reducing" atmosphere converts the copper oxide to substantially elemental copper, producing an electrically conducting layer. The following heat treatment schedule is recommended for this preferred cordierite embodiment:
 1. Heat green substrate to 300° C. at a rate of 25° C./hr.
 2. Hold for 1 hour at 300° C.
 3. Heat substrate to 600° C. at a rate of 200° C./hour.
 4. Heat substrate from 600° C. to 800° C. at 50° C./hour.
 5. Hold at 800° C. for 2 hours.
 6. Then heat substrate 1000° C. at 50° C/hour.
 7. Hold at 1000° C. for 4 hours.
 8. Cool to room temperature at furnace rate (approximately 24 hours)

In another embodiment of this invention, copper sodium aluminoborosilicate glass is heat treated to form a continuous, conductive copper film integral with the glass substrate. A mixture containing 760.7, g. $SiO_2$ (as −200 mesh Supersil), 71.8 g boric acid, 33.1 g hydrated alumina, 64.5 g. sodium carbonate, 59.4 g. cuprous oxide and 10 g. arsenic trioxide (as fining agent) is ball milled, loaded into a 1000 cc silica crucible and melted at 1575° C. for 8 hours without stirring. Roll quenching in air yields a clear, red glass of composition (wt %): 73.4 $SiO_2$; 11.4 $B_2O_3$; 2.2 $Al_2O_3$, 7.0 $Na_2O$; 6.0 CuO. Heating this glass in air at 770° C. for 0.7 hours yields a dull, grey copper oxide film which is converted to a conducting copper metal film ( 1 ohm-cm) on reduction under hydrogen at 300° C. for 2 hours. The oxidation-reduction cycle can be replaced by a single 2 hour, 725° C. reduction cycle under hydrogen to produce a dull, copper metal film. Alternatively, the reduction cycle can also be replaced by in vacuo heating at 770° C. for 2 hours to form a shiny copper sub-layer beneath the glassy surface.

In a further embodiment of this invention, a sodium aluminoborosilicate glass containing cobalt is heat-treated to form a thick cobalt oxide layer. A blend of 716.8 g silica (as −200 mesh Supersil), 106.1 g anhydrous Borax, 67.7 g. boric oxide, 31.1 g alumina hydrate, 58.8 g sodium carbonate and 123.5 g of cobalt oxide (as $Co_3O_4$) is batched, mixed, and melted as previously described. A blue-black glass is formed upon roll quenching which forms a thick cobalt oxide layer on the surface after heating in air at 550° C. for 4 hours.

In still another embodiment of this invention, a mixture containing 380.6 g silica (−200 mesh Supersil) 311.4 g anhydrous alumina, 208.6 g cuprous oxide and 149.1 g sodium carbonate are ball milled, and held in air at 1650° C. for 6 hours without stirring. A green-black glass of composition (wt. %) : 38.0 $SiO_2$; 31.0 $Al_2O_3$; 8.7 $Na_2O$; 22.3 CuO, is formed upon roll-quenching. On heating at 500° C. in air for 3 hours a grey copper oxide layer is formed. Reduction of this glass at 200° C. in hydrogen yields a conducting copper metal film (0.1–1 ohm-cm) on the surface of the substrate.

Once the conducting layer is established, electrical connections can be made and the catalyst structure can be subjected to further controlled electrodeposition of catalytic metals such as platinum or palladium, prior to being placed into service.

In one electrodeposition method of this invention, a substrate coated with a copper film is
 cleaned at 50° C. for 10 minutes in a 'degreasing' solution composed of 25 g. sodium carbonate and 25.3 g. sodium hydroxide in 1.0 liter of distilled water, rinsed in distilled water and etched for 10 seconds in an 'etching' solution composed of 1.6M sulfuric acid, 0.22M nitric acid, 0.005M hydrochloric acid at room temperature. After thorough rinsing in distilled water, the sample is immersed in a sulphato-dinitrito-platinous acid [$H_2Pt(II)(NO_2)_2$ $SO_4$]or 'DNS' solution (0.5% Pt. by weight per unit volume) which has been adjusted to a pH of 4.9 a phosphate buffer and sodium hydroxide and warmed to a temperature between 40° and 0.50° C. Following connection to a potentiostated current source, the sample is platinized by means of current-reversal whereupon the applied voltage is continuously cycled between −0.05 V/SCE held for 16 seconds and +0.20 V/SCE held for 3 seconds until sufficient cathodic charge has passed to insure coverage. A deep, black Pt layer is formed.

The second metallic coating of this invention can also be provided on the substrate by electroless deposition. For example, using commercially available baths, nickel, ruthenium, rhenium, the coinage metals, platinum metals, and/or iron can be electrolessly deposited onto an extruded substrate of alumina or cordierite, providing uniformly-conducting (approximately 0.1–1 ohm-cm) films. In a preferred procedure, platinum is electrolessly deposited directly onto a monolithic substrate of alumina or cordierite using methods as described in U.S. Pat. No. 3,486,928; or by F. A. Lowenheim, in "Modern Electroplating", *Wiley Interscience*, New York 3rd edition, 1693, pp. 356-7, both disclosures being hereby incorporated by reference. In one method for producing a dispersion of platinum metal on the ceramic substrate, a solution of commercially obtained Pt (II) salt; sulphato-dinitrito-platinous acid [$H_2Pt(II)(NO_2)_2 SO_4$]or 'DNS' solution is adjusted to a pH of 2.1 with a phosphate buffer and warmed to 45° C. The substrate preparation including a copper film is then immersed for 60 seconds, washed in distilled water and dried in air at room temperature. A black dispersion of Pt metal is immediately evident and the monolith retains its low resistivity. A similar result is obtained with room temperature chloroplatinic acid used as the platinum source. The product of this electroless reaction can be heated in air to 965° C. for 12 hours. Resistivity of the sample so treated is now in excess of $10^7$ ohm-cm, but a fine Pt metal dispersion is present wherein typical Pt particle diameters are 0.5–1 micron. Although not necessary to electroless deposition, the presence of transition metals on the substrate surface may enhance the efficiency of electroless film formation. Direct metal vapor deposition is also contemplated as a means of producing a second metal-containing film.

Dispersions of platinum metal on the copper surface by simple displacement reaction with aqueous platinum compounds such as chloroplatinic acid and potassium hexachloroplatinate have also been produced. Although the deposited platinum layer is discontinuous and therefore not conductive, the underlying copper film retains its low electrical resistance and promotes electrical continuity. A dispersed coating of platinum can also be obtained by electrodeposition. In general, deposition of catalytic metals such as platinum can be provided by electroless deposition, inks, evaporation of a salt, chemical vapor deposition, electrodeposition or by application of a colloid or a suspension.

The resulting electrically conductive layer provided on the thin walls of the substrate produced by the above-mentioned methods has a resistivity no greater than about 100 ohm-cm, preferably less than 10 ohm-cm, and most preferably from about 0.1–0.0001 ohm-cm. The thickness of the generally continuous, thin layer of conductive transition metal in the preferred embodiment is generally from about 0.1 to about 100 microns, preferably from about 1 to about 5 microns. This conductive transition metal can be produced on the substrate surface, integral with the substrate pores, and/or beneath the surface of the substrate.

Because of the inherently porous nature of the ceramic materials used, the BET surface area of the ceramic substrate itself is generally in the range of 1–3 $m^2$/gm. With a copper coating provided on the substrate, the surface area is approximately the same as the substrate without copper: 1–3 $m^2$/gm. In the preferred embodiment in which platinum is the conductive metal of the coating, the BET surface area is increased to 4–15 $m^2$/gm because of the deposited platinum film.

The system as described thus far is of general practicality to continuous flow electrochemical, electrocatalytic, or catalytic processes. It is anticipated that two immiscible solutions could be passed through the electrode in a similar fashion, or, a single phase could be used where one or more components are electrolyzed. It is also expected that this novel structure can be used in Fischer-Tropsch synthesis, water-gas shift reactions and hydrodesulfurization.

In one use of the catalyst of this invention as an electrode, a gaseous reactant, in the form of bubbles with a diameter slightly smaller than that of the electrocatalyst channel dimensions, is passed through the channel, through which liquid reactant also passes with little pressure drop. During transit, the reactant bubble forms a continuously moving meniscus within the electrocatalyst channels and will eventually contact the entire surface of the channel at a rate dependent on externally applied pressure.

The electrocatalytic electrode as herein described may be incorporated, as an example, into an electrochemically driven Fischer-Tropsch cellular reactor. Traditional Fischer-Tropsch synthesis involves reactions of gas phase hydrogen and carbon monoxide at elevated temperatures over a heterogeneous reactor bed at approximately 200–400° C. Since the reaction is now associated with high energy costs for hydrogen generation, only limited commercial application of this reaction process has occurred to date. State-of-the-art improvements which involve variations on catalyst types, have heretofore typically reduced energy costs or raised product yields by only 1–2%. However, with the use of this invention, energy requirements may be reduced by as much as 15%, or approximately a 700% improvement over the prior art.

For use in Fischer-Tropsch synthesis, it is contemplated that the present invention will be provided in the form of a flow-through, monolithic electrochemical reactor with cell sizes and shapes adjusted through the choice of extrusion dies. In the preferred embodiment, the structure is placed in the electrolytic solution containing water. Carbon monoxide is then bubbled up the length of the monolith held at cathodic potentials necessary for conversion of H+(aqueous) to H(absorbed) at appropriate elevated temperatures. Applied cathodic voltages are transmitted through the structure using, for example, a copper ring wrapped around the outer barrel of the honeycomb structure. Fischer-Tropsch reaction products will form from the combination of the H(absorbed) and carbon monoxide and will be swept out the exit end of the structure for collection. Continuous and flow-controlled contact in the three-phase region between gas, water and the structure walls is thus assured along the entire length of the electrode channel. The advantages in maximizing this contact time on electrochemical conversion efficiencies have been noted in B. Cahan, et. al. *J. Chem. Phys.*, 1969, 50, 1307.

By applying the present invention to the current Fischer-Tropsch process, major improvements can be made, including:

1. energy savings related to use of in situ formation of H(absorbed) rather than externally supplied $H_2$;
2. applicability to continuous flow processes;
3. modification of the Fischer-Tropsch process to a system using water as a reactant, thereby eliminating the necessity for external generation and transport of hydrogen gas;
4. possible reduction of over-potential effects through use of a cellular electrode;
5. extended and controllable contact in the critical three-phase region governing Faradaic current flow.

From the foregoing it can be appreciated that this invention provides an improved apparatus for use in liquid-phase, gas-phase, and mixed-phase reactions, and a method for fabricating the apparatus. The advantages over the prior art are: efficient voltage driven processes, continuous movement of the reaction region, controlled channel size and shape, improved structural integrity, dimensional flexibility, minimal pressure drop, and controlled meniscus shape. Although catalysts, electrocatalysts, and fabrication methods have been illustrated, this was for the purpose of describing, but not limiting, the invention. Various modifications, which will become apparent to one skilled in the art, are within the scope of this invention described in the attached claims.

We claim

1. An apparatus for use in a liquid-phase, gas-phase, or mixed-phase reaction consisting essentially of:
    (a) a substrate selected from the group consisting of glass, glass-ceramic, ceramic, and a mixture thereof, said substrate further including a transition metal oxide, said substrate having thin walls with open porosity, wherein said thin walls define a plurality of cells extending substantially parallel through said substrate so as to be open at both ends for the flowable passage of liquids and gases;
    (b) a first layer formed by diffusing at least a portion of said transition metal oxide to a position integral with the walls of said substrate; and
    (c) a second metal-containing layer superposed on said first layer, wherein the combination of said first and second layers forms a substantially continuous conductive film having a resistivity of no greater than approximately 100 ohm-cm.

2. The apparatus of claim 1 wherein said second metal containing layer consists essentially of elements selected from the group consisting of Ni, Cu, Rh, Fe, Ag, Au, Pd, Pt, Ru, Re and a mixture thereof.

3. The apparatus of claim 1 wherein said transition metal is selected from the group consisting of the first transition, the second transition, and the third transition series of the periodic chart, and a mixture thereof.

4. The apparatus of claim 1 wherein the substrate consists essentially of 2 to 30 weight % $Al_2O_3$, 0 to 12 weight % $B_2O_3$, 55 to 80 weight % $SiO_2$, 0 to 8 weight % $TiO_2$, 0 to 14 weight % $R_2O$ where R is an alkaline metal, 0 to 15 weight % $R'O$ where $R'$ is an alkaline earth metal, and 0.5 to 24 weight % MO where M is a multivalent transition metal cation.

5. The apparatus of claim 1 wherein the substrate consists essentially of 36 to 50 weight % $SiO_2$, 22 to 30 weight % $Al_2O_3$, 2.1 to 13.5 weight % MgO, 2.1 to 2.8 weight % $ZrO_2$, 5.7 to 7.5 weight % $TiO_2$, 0.3 to 0.4 weight % $As_2O_3$, 0 to 11.2 weight % NiO, 0 to 11.9 weight % CuO, 0 to 12.1 weight % ZnO, 0 to 20.3 weight % $SnO_2$, 0 to 23.5 weight % $V_2O_3$, and 0 to 11.8 weight $Co_3O_4$.

6. The apparatus of claim 1 wherein said resistivity is no greater than about 10 ohm-cm.

7. The apparatus of claim 1 wherein said resistivity is no greater than about 0.1 ohm-cm 8. The apparatus of claim 1 wherein said resistivity is no greater than about 0.001 ohm-cm.

9. The apparatus of claim 1 wherein the conductive film has a thickness of from about 0.1 to 100 microns.

10. The apparatus of claim 1 wherein the conductive film has a thickness of from about 1 to 5 microns.

11. The apparatus of claim 1 having a BET surface area of about 1–15 $m^2/gm$.

12. An apparatus for use in liquid-phase, gas-phase or mixed-phase reactions consisting essentially of:
    (a) a substrate of ceramic, glass-ceramic, glass, or mixture thereof having thin walls with open porosity, wherein said thin walls define a plurality of cells extending substantially longitudinally parallel through said substrate so as to be open at both ends for the flowable passage of liquids and gases, said substrate including a transition metal oxide;
    (b) a thin metal-containing layer coating said walls of the substrate having a resistivity no greater than approximately 100 ohm-cm; said metal-containing layer comprising at least a portion of said transition metal oxide of said substrate which have been diffused to a position integral with said walls and then reduced.

13. The apparatus of claim 12 wherein said metal containing layer consists essentially of elements selected from the group consisting of Ni, Re, Cu, Ru, Rh, Fe, Ag, Au, Pd, Pt and a mixture thereof.

14. The apparatus of claim 12 wherein the composition of the ceramic substrate consists of cordierite.

* * * * *